Patented Oct. 26, 1937

2,096,992

UNITED STATES PATENT OFFICE 2,096,992

CARBON PRODUCT AND METHOD OF MAKING SAME

George E. Megow, South Milwaukee, Wis., assignor to Allen-Bradley Company, Milwaukee, Wis., a corporation of Wisconsin No Drawing. Application August 1, 1934, Serial No. 737,927

2 Claims. (Cl. 252—6)

My invention relates in general to the obtainment of carbon in small particle size and more particularly to carbon of small particle size uniformly dispersed in a matrix.

Heretofore carbon in extremely small particle size or colloidal form was obtainable in liquid suspension or in dry state which in these forms when mixed with another substance did not give an even dispersion of the carbon in the substance. The manufacturers of electrical devices such as resistors used in radio circuits, have sought for carbon in usable form of a small size. The above mentioned resistors are of necessity required to be of great uniformity in physical characteristics and therefore an even distribution of the carbon conductor throughout the body of the resistor is also required.

In a divisional application Serial Number 139,586, filed April 28, 1937, assigned to the Allen-Bradley Company, I have claimed the subject matter of my invention as it relates to a resistance unit and method of making the same.

It is therefore an object of my invention to obtain carbon in small particle size and further to provide a method where this carbon of small particle size is uniformly distributed into the material of the article in which the carbon is used.

I have found that electrical resistors as used in radio circuits have been greatly improved by the use of carbon made according to my invention. I have also found that carbon material made according to my invention is successfully used in a coating for electrode elements in electronic devices. In this instance the coating is used to reduce secondary emission of the electrodes in the electronic devices.

It is a known fact that various gels such as a silica gel, and precipitates such as aluminum hydroxide have the property of adsorbing tannic acid, gum catechu, Congo red, carbon suspensions and other similar carbon bearing materials.

I have discovered that this unique characteristic of gels and precipitates can be utilized in preparing a finely divided form of carbon by first adsorbing the carbon bearing material, such as tannic acid, with aluminium hydroxide, and then carefully dehydrating and calcining the combination to yield a finely divided form of carbon and that this carbon is embedded in a matrix of aluminum oxide. In the case of adsorption of tannic acid by silica gel and carrying out the same process, the carbon is embedded in a matrix of silicon dioxide. I have also used a combination of silica gel and aluminum hydroxide with tannic acid and in carrying out the same process the carbon is embedded in a matrix of silicon dioxide and aluminum oxide or a matrix of aluminum silicate depending upon the calcining temperature used.

I have further discovered that if the process is carried out by first preparing the gel and then mixing the carbon bearing material with the gel, the amount of carbon bearing material adsorbed will be less than that which can be adsorbed by a modification of the process. To secure this increased adsorption it is only necessary to form the gel in the presence of the carbon bearing material.

An example of this method is as follows: A five per cent solution, by weight, of aluminum chloride in water, is prepared, to which is added a fifty per cent solution, by weight, of tannic acid in water, using three hundred fifty parts of aluminum chloride, dry basis, and two hundred fifty parts of dry tannic acid. When the solutions are mixed a slight precipitate will form which later dissolves forming a clear brown solution. The reactions are carried out in this dilute form so as to avoid the formation of aluminum tannate in an undissolved form before forming the precipitate.

The formation of the gel is accomplished by adding a base such as ammonium hydroxide until the solution is neutral. As the precipitate forms the tannic acid is adsorbed by the aluminum hydroxide. The gel and adsorbed tannic acid is then separated from the excess tannic acid, water, and ammonium chloride by filtering and washing. In the mix given above practically all of the tannic acid will be adsorbed. At the present time I have not been able to determine the maximum amount of tannic acid that can be adsorbed by this process because the amount adsorbed depends upon the purity of the tannic acid, the dilution of the reagents, and temperature and rate of mixing during the formation of the gel. There is however a pronounced difference in the amounts of tannic acid adsorbed when the gel is prepared by the method just described as compared with the method wherein the gel is prepared out of contact with the tannic acid. The washed filter cake is carefully dehydrated and then calcined to yield an extremely fine dispersion of carbon in a matrix of aluminum oxide.

This method of preparation has the advantage of forming a gel in contact with a carbon bearing compound in such a manner that a high degree of uniformity of composition can be obtained. As the precipitate forms, a definite amount of carbon bearing material is adsorbed and as there is a slight excess present all of the gel forms with the maximum amount of carbon bearing material uniformly distributed throughout the mass of gell in the adsorbed state. Any excess not adsorbed by the gel is removed by washing with water.

Minute wedge like chips of aluminum oxide and carbon have been examined microscopically to determine the fineness of the carbon and the uniformity of the carbon throughout the matrix. The thin edges that are transparent when examined at sixteen hundred fifty diameters appear as a clear transparent light brown field in which it is impossible to locate particles of carbon of sufficient size to even estimate their size. The dispersion is apparently quite uniform although it is difficult to make any exact statement because there are few, if any, regularly formed pieces which may be examined accurately.

This material can be used for various things in which finely divided carbon is essential. As stated previously two uses for this material have been found up to the present time and undoubtedly additional applications will be found.

One of the uses mentioned for this material is in the formation of electrical resistance devices wherein the finely divided carbon in an insulating matrix forms a composite resistance. Material of this type can also be used as an addition to a ceramic mix or as an addition to an organic binder to form a resistor. In the manufacture of a ceramic unit a desirable procedure is to form the gel and carry out the adsorption process in a suspension of the ceramic forming body, followed by filtering, washing, forming, dehydrating, calcination and firing to vitrification.

This carbon material as for in electrodes in electronic devices is used in the following manner. The formed material is ground with clay and an organic binder to the consistency of a smooth paint and applied as a coating to the electronic valve elements. The elements are then baked and fired and the coating forms a thin film that has the property of improving the characteristics of the valve.

From the foregoing description it will be readily apparent to those skilled in the art to which an invention of the character described appertains, that I provide a novel method of subdividing carbon into small particle size and provide for its use in an evenly dispersed form. I attribute the success of my invention to the even dispersion of carbon of small particle size in a matrix, however, I do not want to limit myself to this disclosure as outlining the bounds of my invention but rather an example of what may be accomplished with the method I have outlined.

What I claim as my invention is:

1. The method of obtaining finely divided carbon embedded in aluminum oxide comprising the mixing of tannic acid with aluminum chloride, adding ammonium hydroxide to form a gel and thereafter dehydrating and calcining said gel.

2. The method of obtaining finely divided carbon embedded in aluminum oxide comprising the mixing of tannic acid with aluminum chloride, adding a base to form a gel, and thereafter dehydrating and calcining said gel.

GEORGE E. MEGOW.